United States Patent
Fu et al.

(10) Patent No.: US 12,356,417 B2
(45) Date of Patent: Jul. 8, 2025

(54) WIRELESS COMMUNICATION METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventors: Zhe Fu, Guangdong (CN); Qianxi Lu, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 447 days.

(21) Appl. No.: 17/653,711

(22) Filed: Mar. 7, 2022

(65) Prior Publication Data

US 2022/0191917 A1    Jun. 16, 2022

Related U.S. Application Data

(63) Continuation of application No. PCT/CN2019/109079, filed on Sep. 29, 2019.

(51) Int. Cl.
  *H04W 72/23* (2023.01)
  *H04L 1/1607* (2023.01)
  *H04W 72/0446* (2023.01)

(52) U.S. Cl.
  CPC ........... *H04W 72/23* (2023.01); *H04L 1/1642* (2013.01); *H04W 72/0446* (2013.01)

(58) Field of Classification Search
  CPC .................................................... H04W 72/23
  See application file for complete search history.

(56) References Cited

U.S. PATENT DOCUMENTS

2021/0037561 A1* 2/2021 Lyu ............... H04L 27/2626
2021/0352640 A1* 11/2021 Fan ............... H04L 1/1822

FOREIGN PATENT DOCUMENTS

| CN | 110034835 A | 7/2019 |
| CN | 110035532 A | 7/2019 |
| WO | 2019069238 A1 | 4/2019 |

OTHER PUBLICATIONS

3GPP TR 38.825 V16.0.0 (Mar. 2019)—3rd Generation Partnership Project; Technical Specification Group Radio Access Network; Study on NR Industrial Internet of Things (IoT); (Release 16) (32 pages).

(Continued)

*Primary Examiner* — Abdeltif Ajid
(74) *Attorney, Agent, or Firm* — PERKINS COIE LLP

(57) ABSTRACT

Provided are a wireless communication method, a terminal device and a network device, wherein a CG resource position can be calculated so as to satisfy transmission requirements of a TSC service. The wireless communication method includes: a terminal device determining, according to dedicated information sent by a network device, SFN reference information and a time domain offset of a first CG resource, wherein the SFN reference information is used for indicating a reference time of the time domain offset of the first CG resource; and the terminal device determining, according to the SFN reference information and the time domain offset of the first CG resource, a start offset of the first CG resource and/or a time domain position of a second CG resource.

15 Claims, 6 Drawing Sheets

(56) References Cited

OTHER PUBLICATIONS

3GPP TS 38.214 V16.5.0 (Mar. 2021)—3rd Generation Partnership Project; Technical Specification Group Radio Access Network; NR; Physical layer procedures for data (Release 16) (170 pages).
3GPP TS 38.321 V16.5.0 (Jun. 2021)—3rd Generation Partnership Project; Technical Specification Group Radio Access Network; NR; Medium Access Control (MAC) protocol specification (Release 16) (156 pages).
3GPP TS 38.331 V16.5.0 (Jun. 2021)—3rd Generation Partnership Project; Technical Specification Group Radio Access Network; NR; Radio Resource Control (RRC) protocol specification (Release 16) (956 pages).
3GPP TSG-RAN WG2 Meeting #105bis—R2-1905232—Xi'an, China, Apr. 8-12, 2019—Nokia (Rapporteur), Stage-2 running CR for support of NR Industrial IoT WI (5 pages).
3GPP TSG-RAN WG2 Meeting #106—R2-1905743—Reno, USA, May 13-17, 2019—CATT, Further Discussion on Multiple Active SPS/CGs (5 pages).
International Search Report issued Jun. 24, 2020 of PCT/CN2019/109079 (4 pages).
3GPP "System Architecture for the 5G System (5GS); Stage 2 (Release 16)" 3GPP TS 23.501 V16.12.0; Mar. 2022. 446 pages.
Examination Report for European Application No. 19947180.6 issued Feb. 16, 2023. 7 pages.
First Office Action for Chinese Application No. 202210245068.0 issued Feb. 23, 2023. 15 pages with English translation.
Huawei et al. "Discussion on flexible periodicities for Configured Grant/SPS" R2-1904374; 3GPP TSG-RAN WG2 Meeting 105bis; Xi'an, China; Apr. 8-12, 2019. 5 pages.
3GPP TSG-RAN WG1 Meeting #97 Reno, NV, USA, May 13-17, 2019—R1-1907457—Ericsson, Configured grant enhancement (12 pages).
3GPP TSG-RAN WG2 Meeting #107 Prague, Czech Republic, Aug. 26-30, 2019—R2-1909490—Nokia, Nokia Shanghai Bell, Discussion on supported No. of SPS configurations and periodicities for CG/SPS (7 pages).
3GPP TSG-RAN WG2 Meeting #107 Prague, Czech Republic, Aug. 26-30, 2019—R2-1911380—Resubmission of R2-1907117—Sequans Communications, Configured Grant enhancements for TSC traffic (5 pages).
European Search Report dated Jun. 15, 2022 of European Patent Application No. 19947180.6 (9 pages).
Examination Report of the European application No. 19947180.6, issued on Dec. 6, 2023. 7 pages.
Second Office Action of the European application No. 19947180.6, issued on Jul. 17, 2023. 7 pages.

* cited by examiner

WIRELESS COMMUNICATION METHOD, TERMINAL DEVICE AND NETWORK DEVICE

CROSS-REFERENCE TO RELATED APPLICATION

The present application is a continuation application of International PCT Application No. PCT/CN2019/109079, filed on Sep. 29, 2019, the entire content of which is hereby incorporated by reference.

TECHNICAL FIELD

Implementations of the present disclosure relate to the field of communication, and more specifically, to a wireless communication method, a terminal device, and a network device.

BACKGROUND

Industrial Internet of Things (IIOT) of the fifth-generation mobile communication technology (5-Generation, 5G) introduces a concept of Time Sensitive Communication (TSC) based on transmission requirements on time delay and reliability. A TSC service is usually a service with high reliability and low delay, but in most scenarios, the TSC service appears periodically. At the same time, the TSC service uses pre-Configured Grant (CG) resources for periodic transmissions. Then, since a period of the TSC service may not be an integral multiple of 10240 ms, a higher requirement is put forward for a calculated position of the CG resource, and how to calculate the position of the CG resource to meet a transmission requirement of the TSC service is an urgent problem to be solved.

SUMMARY

An implementation of the present disclosure provides a wireless communication method, a terminal device, and a network device, which can calculate a position of a CG resource to meet a transmission requirement of a TSC service.

In a first aspect, a wireless communication method is provided, including: determining, by a terminal device, System Frame Number (SFN) reference information and a time domain offset of a first CG resource according to dedicated information sent by a network device, wherein the SFN reference information is used for indicating a reference time of the time domain offset of the first CG resource; and determining, by the terminal device, a starting offset of the first CG resource and/or a time domain position of a second CG resource according to the SFN reference information and the time domain offset of the first CG resource.

In a second aspect, a wireless communication method is provided, including: sending, by a network device, dedicated information to a terminal device, wherein the dedicated information is used for the terminal device to determine SFN reference information and a time domain offset of a first CG resource, wherein the SFN reference information is used for indicating a reference time of the time domain offset of the first CG resource, and the time domain offset of the first CG resource is used for the terminal device to determine a starting offset of the first CG resource and/or a time domain position of a second CG resource in combination with the SFN reference information.

In a third aspect, a wireless communication method is provided, including: determining, by a terminal device according to a subframe where indication information sent by a network device is received, reference time domain information of the subframe, wherein the indication information is used for configuring a first CG resource; and determining, by the terminal device, a starting offset of the first CG resource and/or a subframe of a second CG resource according to the reference time domain information.

In a fourth aspect, a terminal device is provided, configured to perform the method according to the first aspect described above or various implementations thereof.

Specifically, the terminal device includes a function module, configured to perform the method according to the first aspect described above or various implementations thereof.

In a fifth aspect, a network device is provided, configured to perform the method according to the second aspect described above or various implementations thereof.

Specifically, the network device includes a function module, configured to perform the method according to the second aspect described above or various implementations thereof.

In a sixth aspect, a terminal device is provided, configured to perform the method according to the third aspect described above or various implementations thereof.

Specifically, the terminal device includes a function module, configured to perform the method in the third aspect described above or various implementations thereof.

In a seventh aspect, a terminal device is provided, including a processor and a memory. The memory is configured to store a computer program, and the processor is configured to call and run the computer program stored in the memory to perform the method according to the first aspect described above or any of various implementations thereof.

In an eighth aspect, a network device is provided, including a processor and a memory. The memory is configured to store a computer program, and the processor is configured to call and run the computer program stored in the memory to perform the method according to the second aspect described above or various implementations thereof.

In a ninth aspect, a terminal device is provided, including a processor and a memory. The memory is configured to store a computer program, and the processor is configured to call and run the computer program stored in the memory to perform the method according to the third aspect described above or various implementations thereof.

In a tenth aspect, an apparatus is provided, configured to implement the method according to any one of the first to third aspects or various implementations thereof.

Specifically, the apparatus includes a processor, configured to call and run a computer program from a memory, so that a device disposed with the apparatus performs the method according to any one of the first to third aspects described above or various implementations thereof.

In an eleventh aspect, a computer readable storage medium is provided, configured to store a computer program, wherein the computer program causes a computer to perform the method according to any one of the first to third aspects described above or various implementations thereof.

In a twelfth aspect, a computer program product is provided, which includes computer program instructions, wherein the computer program instructions cause a computer to perform the method according to any one of the first to third aspects or various implementations thereof.

In a thirteenth aspect, a computer program is provided, which, when being run on a computer, causes the computer to perform the method according to any one of the first to third aspects described above or various implementations thereof.

According to the technical solution of the first aspect or the second aspect described above, the terminal device may determine the SFN reference information and the time domain offset of the first CG resource according to the dedicated information configured by the network device, and determine the starting offset of the first CG resource and/or the time domain position of the second CG resource according to the SFN reference information and the time domain offset of the first CG resource. Therefore, the terminal device and the network device are guaranteed to have same understanding of a starting offset of the CG resource, and a problem of inconsistent understanding of a reference SFN caused by SFN surrounding is avoided, thereby ensuring that the terminal device causes a calculated position of a CG resource to conform to a configuration target of the network device, ensuring that there is an available uplink resource when the TSC service arrives, and thus ensuring Quality of Service (QoS) of the TSC service.

According to the technical solution of the third aspect described above, the terminal device may determine, according to the subframe where the indication information sent by the network device is received, the reference time domain information of the subframe, and determine the starting offset of the first CG resource and/or the subframe of the second CG resource according to the reference time domain information. Therefore, the terminal device and the network device are guaranteed to have same understanding of a starting offset of the CG resource, and a problem of inconsistent understanding of a reference SFN caused by SFN surrounding is avoided, thereby ensuring that terminal device causes a calculated position of the CG resource to conform to a configuration target of the network device, ensuring that there is an available uplink resource when the TSC service arrives, and thus ensuring QoS of the TSC service.

DETAILED DESCRIPTION

Technical solutions in implementations of the present disclosure will be described below with reference to the drawings in the implementations of the present disclosure. It is apparent that the implementations described are just a part of implementations of the present disclosure, but not all of the implementations. According to the implementations of the present disclosure, all other implementations achieved by a person of ordinary skill in the art without paying an inventive effort belong to the protection scope of the present disclosure.

The implementations of the present disclosure may be applied to various communication systems, such as a Global System of Mobile Communication (GSM) system, a Code Division Multiple Access (CDMA) system, a Wideband Code Division Multiple Access (WCDMA) system, a General Packet Radio Service (GPRS), a Long Term Evolution (LTE) system, an Advanced Long Term Evolution (LTE-A) system, a New Radio (NR) system, an evolution system of the NR system, an LTE-based access to unlicensed spectrum (LTE-U) system, an NR-based access to unlicensed spectrum (NR-U) system, a Universal Mobile Telecommunications System (UMTS), Wireless Local Area Networks (WLAN), Wireless Fidelity (WiFi), a next generation communication system, or another communication system, etc.

Generally speaking, traditional communication systems support a limited quantity of connections, and are easy to implement. However, with the development of communication technology, mobile communication systems will not only support traditional communication, but also support, for example, Device to Device (D2D) communication, Machine to Machine (M2M) communication, Machine Type Communication (MTC), or Vehicle to Vehicle (V2V) communication, etc., and the implementations of the present disclosure may also be applied to these communication systems.

Optionally, a communication system in the implementations of the present disclosure may be applied to a Carrier Aggregation (CA) scenario, or a Dual Connectivity (DC) scenario, or a Standalone (SA) network deployment scenario.

Implementations of the present disclosure do not limit frequency spectrums applied. For example, implementations of the present disclosure may be applied to a licensed spectrum, or an unlicensed spectrum.

Figure 1:
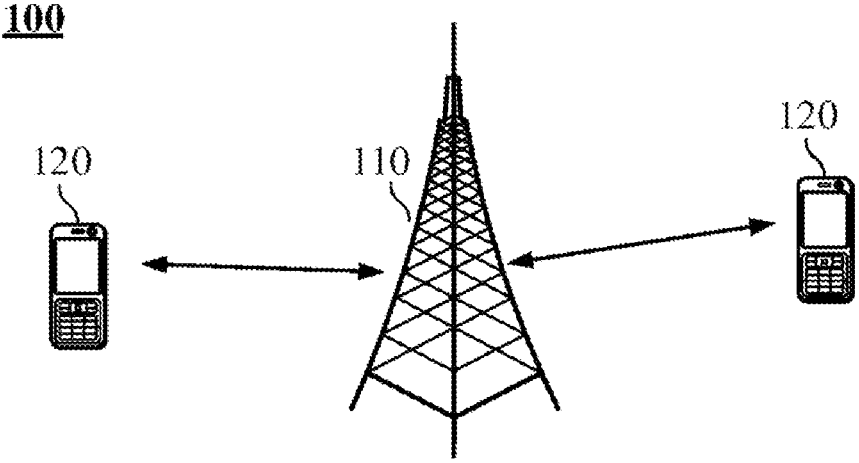
FIG. 1 is a schematic diagram of an architecture of a communication system according to an implementation of the present disclosure.

Exemplarily, a communication system 100 applied in an implementation of the present disclosure is shown in FIG. 1. The communication system 100 may include a network device 110, wherein the network device 110 may be a device that communicates with a terminal device 120 (or referred to as a communication terminal device, or a terminal device). The network device 110 may provide communication coverage for a specific geographical area, and may communicate with terminal devices located within the coverage area.

FIG. 1 illustratively shows one network device and two terminal devices. Optionally, the communication system 100 may include multiple network devices, and another quantity of terminal devices may be included within the coverage area of each network device, which is not limited in the implementations of the present disclosure.

Optionally, the communication system 100 may also include another network entity, such as a network controller, a mobile management entity, or the like, which is not limited in the implementations of the present disclosure.

It should be understood that a device with a communication function in a network/system in the implementations of the present disclosure may be referred to as a communication device. Taking the communication system 100 shown in FIG. 1 as an example, the communication device may include a network device 110 and terminal devices 120 which have communication functions, and the network device 110 and the terminal devices 120 may be the specific devices described above, which will not be described repeatedly here. The communication device may also include other devices in the communication system 100, for example other network entities, such as network controllers, mobile management entities, or the like, which is not limited in the implementations of the present disclosure.

It should be understood that the terms "system" and "network" herein are often used interchangeably herein. The term "and/or" herein is an association relationship describing associated objects only, indicating that three relationships may exist, for example, A and/or B may indicate three cases: A alone, both A and B, and B alone. In addition, the symbol "/" in this document generally indicates that objects before and after the symbol "/" have an "or" relationship.

Implementations of the present disclosure describe various implementations in combination with a terminal device and a network device, wherein the terminal device may also be referred to a User Equipment (UE), an access terminal device, a subscriber unit, a subscriber station, a mobile station, a mobile platform, a remote station, a remote terminal device, a mobile device, a user terminal device, a terminal device, a wireless communication device, a user agent, or a user apparatus, etc. The terminal device may be a STATION (ST) in the WLAN, a cellular phone, a cordless phone, a Session Initiation Protocol (SIP) phone, a Wireless Local Loop (WLL) station, a Personal Digital Assistant (PDA) device, a handheld device with a wireless communication function, a computing device, or another processing device connected to a wireless modem, a vehicle-mounted device, a wearable device, or a next generation communication system, such as, a terminal device in an NR network, or a terminal device in a future evolved Public Land Mobile Network (PLMN), etc.

By way of an example but not a limitation, in an implementation of the present disclosure, the terminal device may also be a wearable device. The wearable device may also be referred to a wearable intelligent device, which is a general term of wearable devices developed by an intelligent design of daily wear applying wearing technology, e.g., glasses, gloves, a watch, clothing, or shoes, etc. The wearable device is a portable device that is worn directly on a body, or integrated into the clothes or accessories of a user. The wearable device is not only a hardware device, but also realizes powerful functions through software support, as well as a data interaction or a cloud interaction. Generalized wearable smart devices include devices that are full functioned, large sized, and may realize complete or partial functions without relying on smart phones, such as a smart watch, or smart glasses, etc., and include devices that only focus on a certain kind of application functions, and need to be used in conjunction with other devices such as smart phones, such as various smart bracelets, smart jewelry, or the like, for monitoring physical signs.

The network device may be a device for communicating with a mobile device, or may be an Access Point (AP) in the WLAN, or a Base Transceiver Station (BTS) in GSM or CDMA, or may be a NodeB (NB) in WCDMA, or an Evolutional Node B (eNB or eNodeB) in LTE, or a relay station or an access point, or a vehicle-mounted device, a wearable device, as well as a network device or a gNB in the NR network, or a network device in a future evolved PLMN network, etc.

In an implementation of the present disclosure, the network device provides a service for a cell, and the terminal device communicates with the network device through a transmission resource (e.g., a frequency domain resource, or called a spectrum resource) used by the cell, wherein the cell may be a cell, corresponding to the network device (e.g., a base station), which may belong to a macro base station, or a base station corresponding to a Small cell. The Small cell here may include: a Metro cell, a Micro cell, a Pico cell, or a Femto cell, etc. These Small cells have characteristics of a small coverage range and a low transmission power, and are suitable for providing high-speed data transmission services.

A requirement in 5G IIoT supports a transmission of a service such as Factory automation, Transport Industry, or Electrical Power Distribution, etc., in a 5G system. IIoT introduces a concept of a Time sensitive network (TSN) network or TSC, based on transmission requirements of time delay and reliability thereof. According to service characteristics of the TSN network, a TSC service is usually a service with high reliability and low delay, and in most scenarios, TSC services appear periodically.

In order to better serve the TSC services, and ensure transmission QoSs of the TSC services, CG resources are used to transmit these periodic services for uplink data. Due to the diversity of the TSC services, it is caused that a part of TSC service periods is not an integer multiple of a time unit of (1024*SFN), that is, N*TSC period (periodicity) cannot be divided exactly by (1024*SFN), wherein N is an integer which >=1.

The CG resources are divided into two types: a type 1 and a type 2. The CG resource of the type 1 is a CG resource configured, i.e., activated, by a Radio Resource Control (RRC), and the CG resource of the type 2 is a CG resource that may only be activated after being configured when Downlink Control Information (DCI) indicates to activate the resource.

The implementation of the present disclosure mainly focuses on the CG resource of the type 1, and the following description mainly focuses on the CG resource of the type 1.

A position of the CG resource of the type 1 is notified in the RRC. Specifically, main CG information that will be notified in the RRC includes: a period, a frequency domain position, or a time domain offset. Herein, the time domain offset is given by two parameters: timeDomainOffset and timeDomainAllocation.

Herein, the timeDomainOffset is an offset at a slot level relative to SFN=0, and the timeDomainAllocation is an offset at a symbol level within a slot.

Formula 1 for calculating a specific position of the CG resource of the type 1 is as follows:

$$[(SFN \times P \times Q)+(K \times Q)+F]=(\text{timeDomainOffset} \times Q+S+ N \times T)\text{Mod}(1024 \times P \times Q), N>=0.$$

Herein, P is the number of slots in one radio frame (numberOfSlotsPerFrame), Q is the number of symbols in one slot (numberOfSymbolsPerSlot), K is the number of slots in the radio frame (slot number in the frame), F is the number of symbols in the slot (symbol number in the slot), S is the offset or an index at the symbol level calculated according to the timeDomainAllocation, and T is the period (periodicity).

Figure 2:
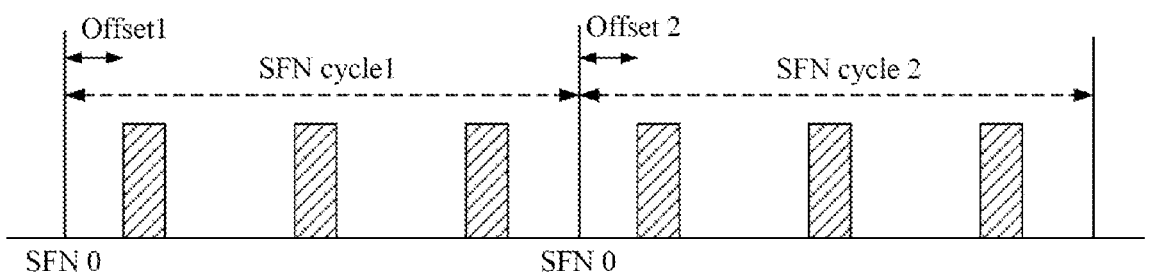
FIG. 2 is a schematic diagram of offsets in different SFN cycles being same according to the present disclosure.

There are 1024 radio frames in every SFN cycle, and their labels are, e.g., 0~1023. One time of SFN wrap around needs to be done on every 1024 radio frames, that is, a frame number of the SFN starts from 0 again. According to the above formula it can be learnt that, when a period (periodicity) of a CG resource can be divided exactly by 1024*SFN or 10240 ms, that is, it can be divided exactly by (1024× P×Q), a calculated starting offset of the CG resource is same for every SFN cycle, that is, a time domain position of an initial CG resource or a corresponding first CG resource in the SFN cycle is same (an offset of an SFN of an initial CG relative to SFN=0 in every SFN cycle is same) for every SFN cycle. As shown in FIG. 2, an offset 1 in an SFN cycle 1 is same as an offset 2 in an SFN cycle 2.

Figure 3:
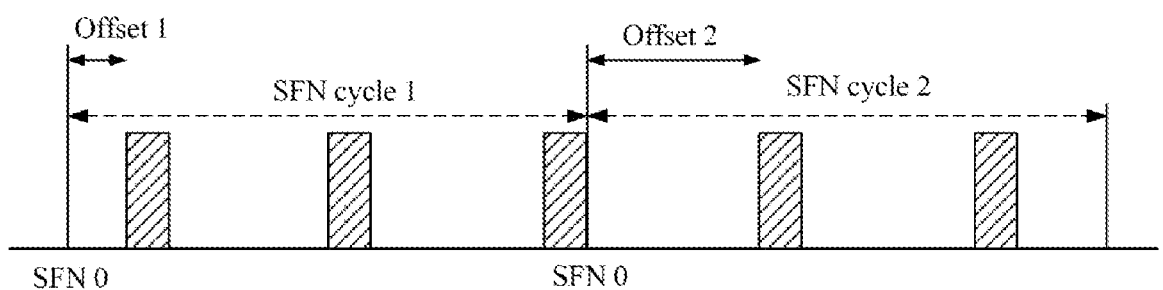
FIG. 3 is a schematic diagram of offsets in different SFN cycles being different according to the present disclosure.

The period of the TSC service may not be an integral multiple of 10240 ms, but when the period of the CG resource cannot be divided exactly by 1024*SFN or 10240 ms, that is, it cannot be divided exactly by (1024×P×Q), the calculated starting offset of the CG resource is different for every SFN cycle, that is, a time domain position of the initial CG resource or the corresponding first CG resource in the SFN cycle is different (the offset of the SFN of the initial CG is different relative to SFN=0 in every SFN cycle) for every SFN cycle. As shown in FIG. 3, the offset 1 in the SFN cycle 1 is different from the offset 2 in the SFN cycle 2.

Therefore, it is necessary to consider a problem on how to determine which SFN=0 is a reference SFN, when the period (periodicity) of the CG resource cannot be divided exactly by 1024*SFN, and when a CG resource configured by an RRC message is received. This problem is more prominent in the following cases: when the network device sends an RRC message containing a CG configuration in an SFN (e.g., SFN=1022) close to SFN=1024, it may be caused that the terminal device does not receive the RRC configuration until a next SFN cycle (e.g., in the subframe with SFN=2 in the next SFN cycle, it receives the RRC message), due to a problem of a retransmission of the RRC message. As a result, the terminal device does not know which of positions of SFN=0 in two SFN cycles is used as a reference subframe to calculate the starting offset of the CG resource, which further leads to an error in the calculated position of the CG resource, and that there is no available uplink resource for a transmission when the TSC service arrives, thereby leading to a problem that a QoS of the TSC service cannot be guaranteed.

Based on the above technical problem, the present disclosure proposes a solution for calculating the starting offset of the CG resource, which ensures that the terminal device and network device have same understanding of a reference point, thus ensuring that the position of the CG resource calculated by the terminal device conforms to a network device configuration target, ensuring that there is an available uplink resource when the TSC service arrives, and thereby ensuring the QoS of the TSC service.

The solution for calculating the starting offset of the CG resource designed by the present disclosure for the above problem is described as follows in detail.

Figure 4:
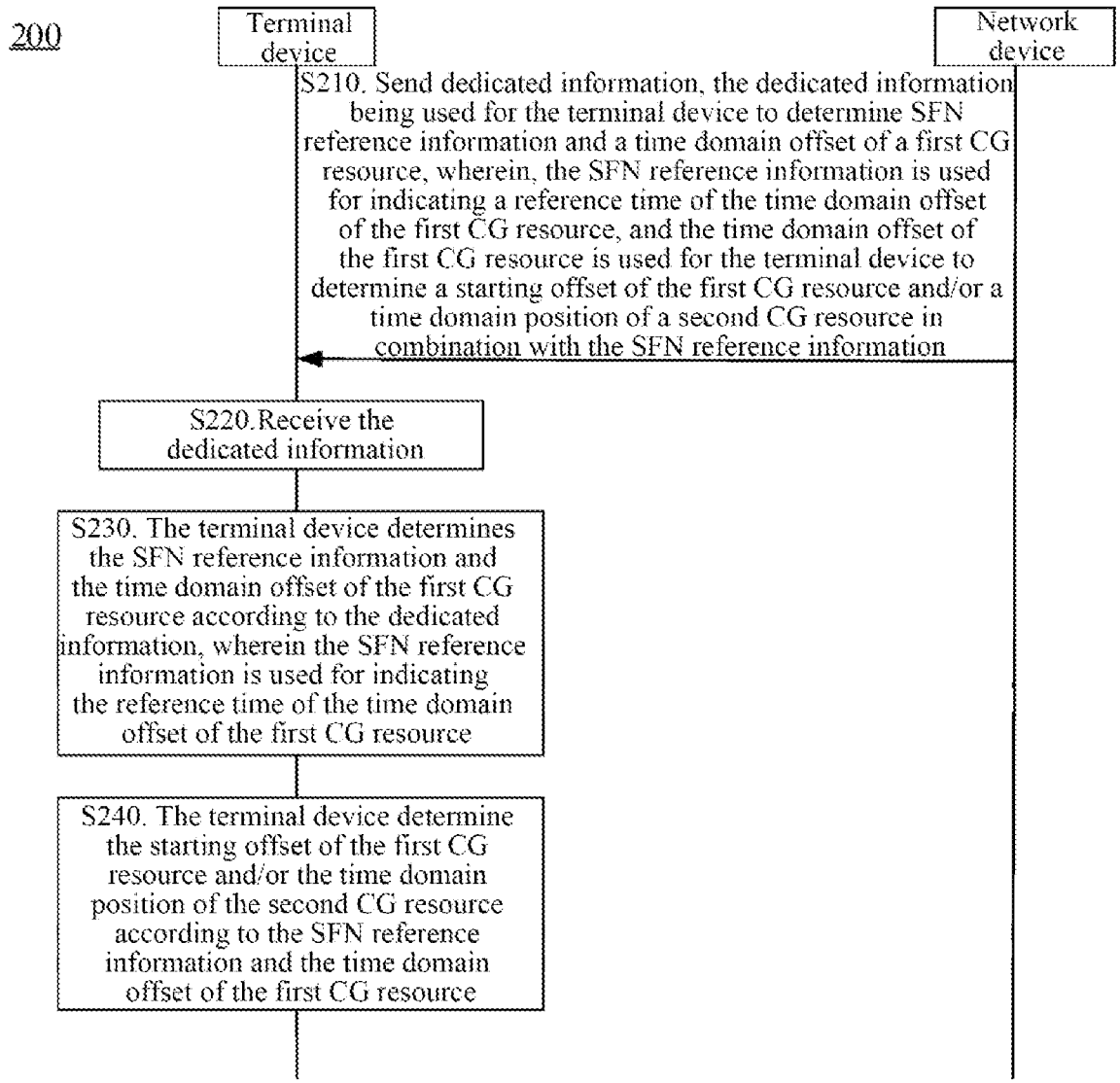
FIG. 4 is a schematic flow chart of a wireless communication method according to an implementation of the present disclosure.

FIG. 4 is a schematic flow chart of a wireless communication method 200 according to an implementation of the present disclosure. As shown in FIG. 4, the method 200 may include a part or all of the following contents S210 to S240.

At S210, a network device sends dedicated information to a terminal device, the dedicated information being used for the terminal device to determine SFN reference information and a time domain offset of a first CG resource, wherein the SFN reference information is used for indicating a reference time of the time domain offset of the first CG resource, and the time domain offset of the first CG resource is used for the terminal device to determine a starting offset of the first CG resource and/or a time domain position of a second CG resource in combination with the SFN reference information.

At S220, the terminal device receives the dedicated information sent by the network device.

At S230, the terminal device determines the SFN reference information and the time domain offset of the first CG resource according to the dedicated information, wherein the SFN reference information is used for indicating the reference time of the time domain offset of the first CG resource.

At S240, the terminal device determines the starting offset of the first CG resource and/or the time domain position of the second CG resource according to the SFN reference information and the time domain offset of the first CG resource.

Optionally, in the implementation of the present disclosure, the dedicated information further includes at least one of the following: a period of a CG resource, a frequency domain position of the CG resource, a time domain offset at the slot level of the CG resource, a time domain offset at a radio frame level of the CG resource, or a time domain offset at the symbol level of the CG resource.

Specifically, the terminal device receives the dedicated information sent by the network device through an RRC signaling.

For example, the RRC signaling is a pre-configured grant configuration Information element (IE).

Optionally, the first CG resource and/or the second CG resource are CG resources of the type 1.

Optionally, in the implementation of the present disclosure, the SFN reference information at least includes one of the following: an SFN label or a slot symbol, wherein the SFN label at least includes one of the following: an SFN index or an SFN identity.

Optionally, in a case that the SFN reference information includes the SFN label and the slot symbol, the slot symbol is used for indicating a slot identity in an SFN corresponding to the SFN label, or the slot symbol is used for indicating a slot offset value of a slot 0 in the SFN.

Optionally, in a case that the SFN reference information includes the slot symbol, the slot symbol is used for indicating a slot identity in any one SFN cycle, or the slot symbol is used for indicating an SFN 0 or a slot offset value of a slot 0 in the SFN 0 in any one SFN cycle.

Optionally, in the implementation of the present disclosure, the SFN reference information is a corresponding SFN and/or slot when the network device sends the dedicated information; or, the SFN reference information is an SFN and/or a slot when the network device sends the dedicated information; or, the SFN reference information is an SFN and/or a slot when the network device configures the CG resource. That is, the network device may determine SFN information in time by sending the dedicated information or configuring the CG resource, thereby ensuring timeliness of the SFN information.

Optionally, in the implementation of the present disclosure, the above S230 may specifically be: the terminal device takes one piece of the SFN reference information before and closest to a second SFN as a target offset reference point, wherein the second SFN is an SFN when the terminal device receives the dedicated information; and the terminal device determines the starting offset of the first CG resource according to the target offset reference point and the time domain offset of the first CG resource.

Optionally, a value of the second SFN is greater than or equal to a value of the SFN corresponding to the SFN reference information.

Optionally, the value of the second SFN is smaller than the value of the SFN corresponding to the SFN reference information.

Optionally, in the implementation of the present disclosure, the terminal device may also determine at least one CG resource according to the starting offset of the CG resource.

In other words, for the network device, the dedicated information is used for the terminal device to determine the at least one CG resource according to the starting offset of the CG resource.

Optionally, the at least one CG resource is distributed in at least one SFN cycle.

Optionally, in the implementation of the present disclosure, the above S230 may specifically be: the terminal device determines the SFN reference information according to a designated SFN, wherein the designated SFN includes an SFN closest to a receiving moment of the dedicated information before receiving the dedicated information, and the designated SFN has a same time point as the SFN reference information.

Optionally, the above S240 may specifically be: the terminal device determines the starting offset of the first CG resource and/or the time domain position of the second CG resource according to the designated SFN and the time domain offset of the first CG resource.

Optionally, the time domain position of the second CG resource is an initial time domain position in one or more SFN cycles after the first CG resource.

Optionally, the time domain position of the second CG resource is a time domain position of every CG resource in one or more SFN cycles after the first CG resource.

Optionally, the time domain offset of the first CG resource includes one of the following: a time domain offset at a radio frame level, or a time domain offset at the slot level.

It should be understood that in the implementation of the present disclosure, the radio frame is a system frame, or the radio frame is a frame corresponding to a system frame number.

The wireless communication method 200 of the implementation of the present disclosure will be described in detail below through specific implementations.

Optionally, as an implementation 1, the network device configures the CG resource of the type 1 to the terminal device through the RRC, for example, the network device configures an uplink CG resource related parameter through the pre-configured grant configuration Information Element (configuredgrantconfig IE).

The uplink CG resource related parameter may specifically include the following.

a) It is configured a period (periodicity) of the CG resource.

For example, the period is 5130 ms.

b) It is configured the reference SFN information, which includes the SFN label and/or the slot label.

The slot label is a corresponding slot identity in an SFN or a corresponding slot identity of an SFN cycle.

Optionally, time information corresponding to the reference SFN information may be a corresponding SFN and/or slot when the network device sends a CG resource configuration including the type 1, or a sending moment of CG resource configuration information of the type 1, or a moment at which the CG resource is configured.

Optionally, the reference SFN information is the SFN label. Specifically, the SFN label is the SFN index or the SFN identity (id).

For example, the reference SFN information is the SFN label, for example an SFN 20.

Optionally, the reference SFN information is the SFN label and the slot label.

The SFN label is the SFN index or the SFN id.

The slot label is a slot identity in an SFN corresponding to the SFN label, or a slot offset value relative to the slot 0 of the SFN. The slot label may also be the slot index.

For example, the reference SFN information is the SFN label and the slot label, for example an SFN 20 and a slot 3.

Optionally, the reference SFN information is the slot label.

The SFN label is a slot label in any one SFN cycle, or a slot offset value relative to the slot 0 of the SFN 0 or the SFN 0 in the SFN cycle.

For example, assume that under a SCS of 15 khz, the reference SFN information is the slot label, for example a slot 203.

c) It is configured the time offset (timeDomainOffset) of the CG resource.

For example, offset SFNs are 3 SFNs, that is, offset slots are 30 slots (a Subcarrier Spacing (SCS) of 15 khz).

Optionally, a range of values of the timeDomainOffset is 0~5119. For example, the value may be extended to support an IIoT service. For another example, different ranges of values may be given according to different SCSs.

For example, the offset SFNs are 3 SFN, that is, the offset slots are 30 slots.

d) It is configured a time allocation (timeDomainAllocation) of the CG resource.

For example, an offset symbol is 0, that is, a transmission position is a position with symbol=0.

In the implementation 1, the terminal device receives the CG resource of the type 1 configured by the network device through the RRC, and acquires the reference SFN information, the timeDomainOffset, or the like. Then, according to the given reference SFN information, the terminal device calculates the starting offset of the CG resource of the type 1 configured and a position of every subsequent available CG resource (the calculated position of the CG resource is distributed in at least one SFN cycle; herein, one or more positions of CG resources may exist in every SFN cycle), using a calculation formula of the GC resource.

Specifically, the terminal device determines a receiving SFN and/or slot at which an RRC message containing the SFN information, and/or, a message of the type 1 is received.

For example, the terminal device receives the RRC message at an SFN 21 of an SFN cycle 2.

Figure 5:
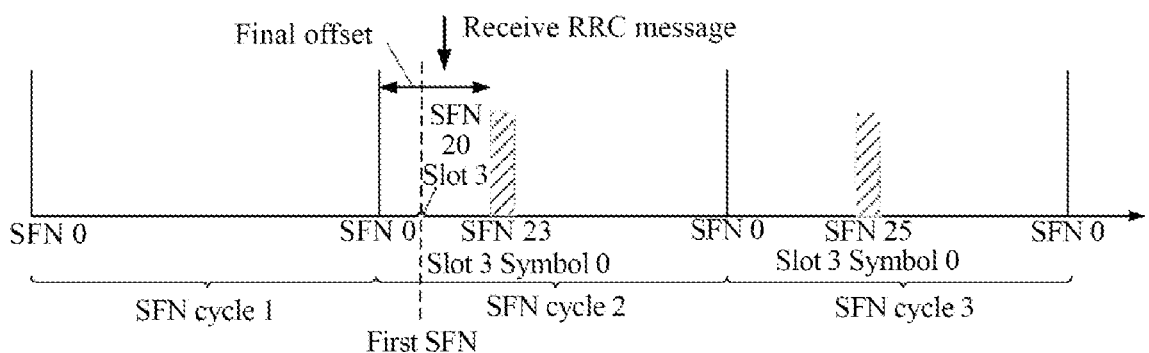
FIG. 5 is a schematic diagram of a determination of a CG source according to an implementation of the present disclosure.

For example, as shown in FIG. 5, the terminal device determines the reference SFN information according to the RRC message. The reference SFN information is the reference time of the timeDomainOffset. Specifically, the terminal device takes one piece of the reference SFN information before an SFN at which the RRC message is received and closest to a moment when the RRC message is received as a reference point. For convenience of identification, it is designated as a first SFN, which must be at a same time point as the reference SFN label and/or the reference slot label.

The time when the terminal device receives the RRC message containing the reference SFN information is the SFN 21 (corresponding to the SFN cycle 2), and the reference SFN information indicated in the RRC is a slot 3 (or a slot 203) of an SFN 20. Then the reference point is the slot 3 or the slot 203 of the SFN 20 (corresponding to the SFN cycle 2). That is, the first SFN is the slot 3 or the slot 203 of the SFN 20 (corresponding to the SFN cycle 2).

Then, the terminal device takes the reference SFN information or the first SFN as a reference time point of a time offset value (offset) indicated by the timeDomainOffset IE.

The terminal device calculates the starting offset of the CG resource according to the reference SFN information or the determined first SFN.

Specifically, the reference point or the first SFN is determined as the slot 3 or the slot 203 of the SFN 20 (corresponding to the SFN cycle 2). The value of the timeDomainOffset is 3 SFNs, that is, the offset slots are 30. The value of the timeDomainAllocation is 0, that is, the offset symbol is 0. Then, the calculated initial offset position of the CG, that is, an initial CG time domain position is a position with SFN=23, slot 3, symbol=0 (corresponding to the SFN cycle 2).

Accordingly, in a next SFN cycle (for example an SFN cycle 3 as in FIG. 5), the initial CG time domain position calculated by the first SFN is a position with SFN=23, slot 3, symbol=0 (corresponding to the SFN cycle 3). And so on.

Optionally, as an implementation 2, the network device configures the CG resource of the type 1 to the terminal device through the RRC, for example, the network device configures an uplink CG resource related parameter through the configuredgrantconfig IE.

The uplink CG resource related parameter may specifically include the following.

a) It is configured a period (periodicity) of the CG resource.
    For example, the period is 5130 ms.
b) It is configured reference SFN information, which includes the SFN label and/or the slot label.

The slot label is a corresponding slot identity within an SFN or a corresponding slot identity of an SFN cycle.

Optionally, time information corresponding to the reference SFN information may be a corresponding SFN and/or slot when the network device sends a CG resource configuration including the type 1, or a sending moment of CG resource configuration information of the type 1, or a moment at which the CG resource is configured.

Optionally, the reference SFN information is the SFN label. Specifically, the SFN label is the SFN index or the SFN identity (id).

For example, the reference SFN information is the SFN label, for example an SFN 1020.

Optionally, the reference SFN information is the SFN label and the slot label.

The SFN label is the SFN index or the SFN id.

The slot label is a slot identity in an SFN corresponding to the SFN label, or a slot offset value relative to the slot 0 of the SFN.

For example, the reference SFN information is the SFN label and the slot label, for example an SFN 1020 and a slot 3.

Optionally, the reference SFN information is the slot label.

The SFN label is a slot identity in any one SFN cycle, or a slot offset value relative to the slot 0 of the SFN 0 or the SFN 0 in the SFN cycle. The slot identity may also be the slot index.

For example, assume that under the SCS of 15 khz, the reference SFN information is the slot label, for example a slot 10203.

c) It is configured the time offset (timeDomainOffset) of the CG resource.

For example, offset SFNs are 3 SFNs, that is, offset slots are 30 slots (the SCS of 15 khz).

Optionally, a range of values of the timeDomainOffset is 0~5119. For example, the value may be extended to support the IIoT service. For another example, different ranges of values may be given according to different SCSs.

For example, the offset SFNs are 5 SFN, that is, the offset slots are 50 slots.

d) It is configured the time allocation (timeDomainAllocation) of the CG resource.

For example, an offset symbol is 0, that is, a transmission position is a position with symbol=0.

In the implementation 2, the terminal device receives the CG resource of the type 1 configured by the network device through the RRC, and acquires the reference SFN information, the timeDomainOffset, or the like. Then, according to the given reference SFN information, the terminal device calculates the starting offset of the CG resource of the type 1 configured and a position of every subsequent available CG resource (the calculated position of the CG resource is distributed in at least one SFN cycle; herein, one or more positions of CG resources may exist in every SFN cycle), using a calculation formula of the GC resource.

The terminal device determines a receiving SFN and/or slot at which an RRC message containing the SFN information, and/or, a message of the type 1 is received.

For example, the terminal device receives the RRC message at an SFN 5 of a second SFN cycle.

Figure 6:
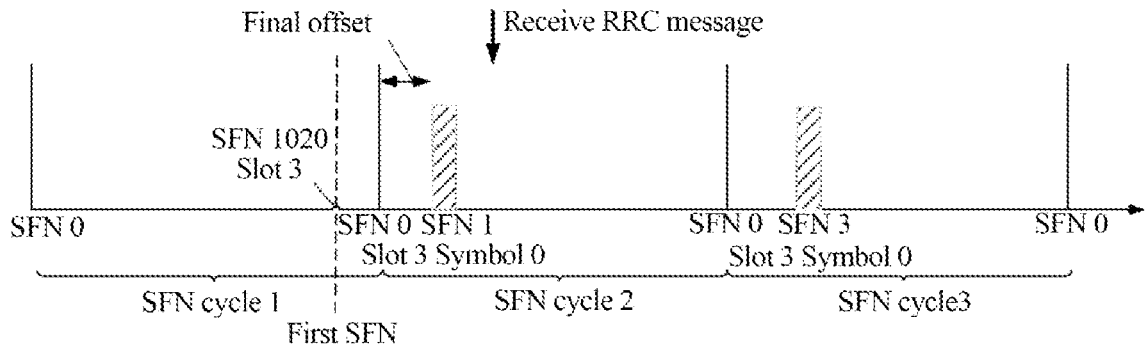
FIG. 6 is a schematic diagram of another determination of a CG source according to an implementation of the present disclosure.

For example, as shown in FIG. 6, the terminal device determines the reference SFN information according to the RRC message. The reference SFN information is the reference time of the timeDomainOffset. Specifically, the terminal device takes one piece of the reference SFN information before an SFN at which the RRC message is received and closest to a moment when the RRC message is received as a reference point. For convenience of identification, it is designated as a first SFN, which must be at a same time point as the reference SFN label and/or the reference slot label.

For example, the time when the terminal device receives the RRC message containing the reference SFN information is the SFN 5 (corresponding to the SFN cycle 2), and the reference SFN information indicated in the RRC is a slot 3 (or a slot 10203) of an SFN 1020. Then the reference point is the slot 3 or the slot 10203 of the SFN 1020 (corresponding to the SFN cycle 1). That is, the first SFN is the slot 3 or the slot 10203 of the SFN 1020 (corresponding to the SFN cycle 1).

Then, the terminal device takes the reference SFN information or the first SFN as the reference time point of the time offset value (offset) indicated by the timeDomainOffset IE.

The terminal device calculates the starting offset of the CG resource according to the reference SFN information or the determined first SFN.

For example, according to the above, the reference point or the first SFN is determined as the slot 3 or the slot 10203 of the SFN 1020 (corresponding to the SFN cycle 1). The value of the timeDomainOffset is 5 SFNs, that is, the offset slots are 50. The value of the timeDomainAllocation is 0, that is, the offset symbol is 0. Then, the calculated initial offset position of the CG, that is, an initial CG time domain position is a position with SFN=1, slot 3, symbol=0 (corresponding to the SFN cycle 2).

Accordingly, in a next SFN cycle (for example an SFN cycle 3 as in FIG. 6), the initial CG time domain position calculated by the first SFN as shown in FIG. 6 is a position with SFN=3, slot 3, symbol=0 (corresponding to the SFN cycle 3). And so on.

It should be understood that the formula for calculating the position of the CG resource in the implementation of the present disclosure may refer to the above formula 1.

Therefore, in the implementation of the present disclosure, the terminal device may determine the SFN reference information and the time domain offset of the first CG resource according to the dedicated information configured by the network device, and determine the starting offset of the first CG resource and/or the time domain position of the second CG resource according to the SFN reference information and the time domain offset of the first CG resource. Therefore, the terminal device and the network device are guaranteed to have the same understanding of the starting offset of the CG resource, and a problem of inconsistent understanding of the reference SFN caused by SFN surrounding is avoided, thereby ensuring that the terminal device causes a calculated position of a CG resource to conform to a configuration target of the network device, ensuring that there is an available uplink resource when the TSC service arrives, and thus ensuring QoS of the TSC service.

Figure 7:
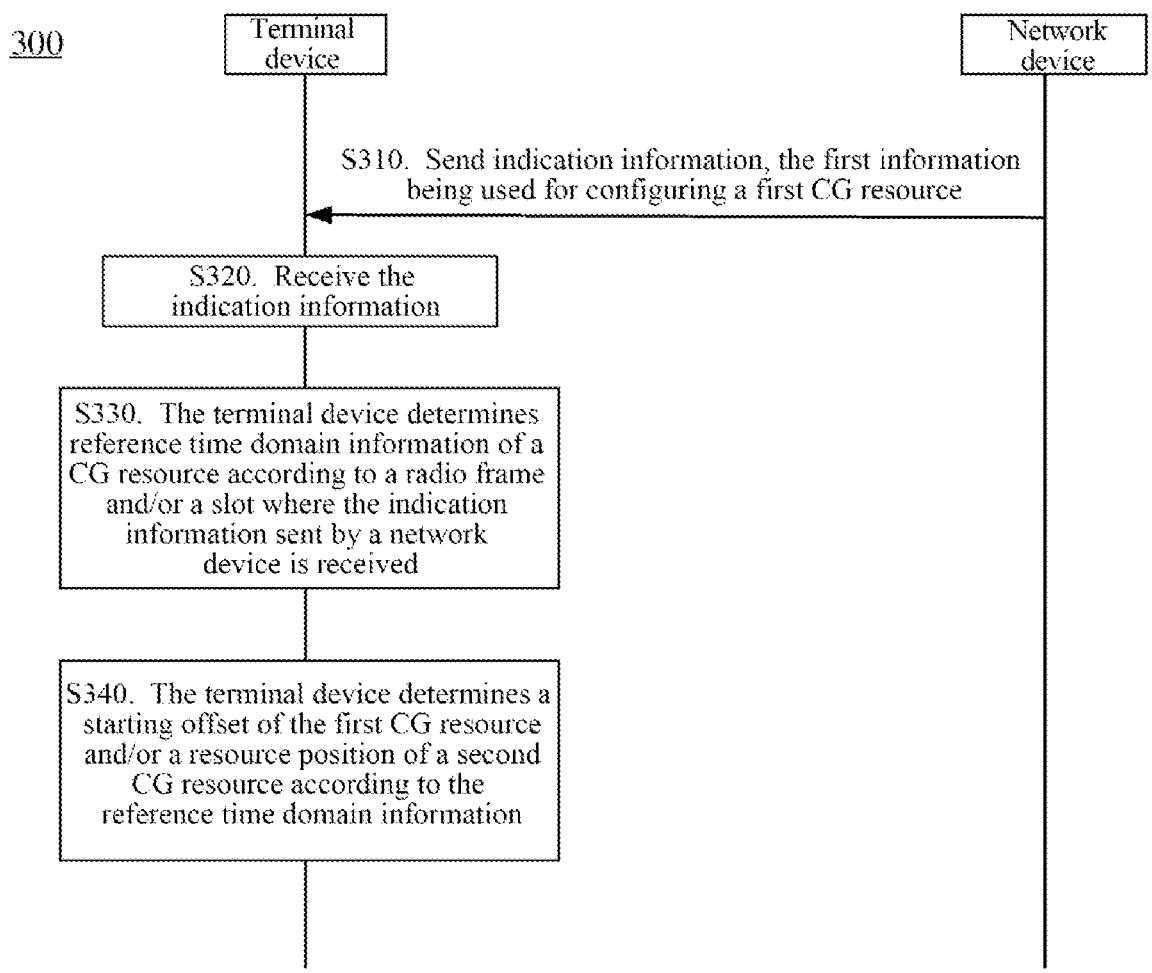
FIG. 7 is a schematic block diagram of a terminal device according to an implementation of the present disclosure.

FIG. 7 is a schematic flow chart of a wireless communication method 300 according to an implementation of the present disclosure. As shown in FIG. 7, the method 300 may include part or all of the following contents S310 to S340.

At S310, a network device sends indication information to a terminal device, the indication information being used for configuring a first CG resource.

At S320, the terminal device receives the indication information.

At S330, the terminal device determines reference time domain information of the CG resource according to a radio frame and/or a slot where the indication information sent by the network device is received.

At S340, the terminal device determines a starting offset of the first CG resource and/or a resource position of a second CG resource according to the reference time domain information.

Optionally, in the implementation of the present disclosure, the indication information further includes at least one of the following: a period of the CG resource, a frequency domain position of the CG resource, a time domain offset at the slot level of the CG resource, a time domain offset at a radio frame level of the CG resource, or a time domain offset at the symbol level of the CG resource.

Specifically, the terminal device receives the indication information sent by the network device through an RRC signaling.

For example, the RRC signaling is a pre-configured grant configuration IE.

Optionally, the first CG resource and/or the second CG resource are CG resources of a type 1.

Optionally, in the implementation of the present disclosure, the reference time domain information at least includes one of the following: a reference SFN cycle, or a reference SFN.

Optionally, in a case that the reference time domain information includes the reference SFN cycle, the above act S330 specifically includes one of the following: the terminal device determines the starting offset of the CG resource and/or the resource position of the second CG resource according to the SFN cycle where the SFN and/or the slot is located; or the terminal device determines the starting offset of the CG resource and/or the resource position of the second CG resource according to an N-th cycle before an SFN cycle where the SFN and/or the slot is located, wherein N is a positive integer.

Optionally, in a case that the reference time domain information includes a reference radio frame, the above act S330 at least includes one of the following: the terminal device determines the starting offset of the first CG resource and/or the resource position of the second CG resource according to a first designated radio frame in the SFN cycle where the SFN and/or the slot is located; or the terminal device determines the starting offset of the first CG resource and/or the resource position of the second CG resource according to a second designated radio frame in an N-th cycle before the SFN cycle where the SFN and/or the slot is located, wherein N is a positive integer.

Optionally, the first designated radio frame and the second designated radio frame are indicated by the indication information or other dedicated information, or the first designated radio frame and the second designated radio frame are predefined radio frames. Specifically, the designated SFN may be an SFN0 or an SFN5120.

Optionally, in a case that the reference time domain information includes a reference subframe, the above act S330 is specifically: the terminal device determines a radio frame with a time domain interval from the SFN and/or the slot being smaller than a preset interval as a third radio frame in a time domain; or, the terminal device determines the starting offset of the first CG resource and/or the resource position of the second CG resource according to the third radio frame.

Optionally, the preset interval is indicated by the indication information or other dedicated information, or the preset interval is a predefined time domain interval.

Optionally, a radio frame of the second CG resource is an initial radio frame in one or more SFN cycles after the first CG resource.

Optionally, the radio frame of the second CG resource is at least one radio frame in one or more SFN cycles after the first CG resource.

Optionally, the resource position of the second CG resource is a time domain position of at least one CG resource in one or more SFN cycles after the first CG resource.

Optionally, the time domain position of the second CG resource is a time domain position of at least one CG resource in one or more SFN cycles after the first CG resource.

Optionally, in the implementation of the present disclosure, the indication information is indication information that the network device does not perform sending at a time domain position where the SFN is 0 or a time domain position in a first range within the SFN cycle.

Optionally, the indication information is indication information that the network device sends at a time domain position except the SFN 0 within the SFN cycle, or the indication information is indication information that the network device sends at a time domain position except the first range within the SFN cycle.

Optionally, in an implementation of the present disclosure, the indication information is, within the SFN cycle, indication information that the network device does not perform sending at a time domain position of a middle value of the third radio frame in two adjacent SFNs or a time domain position in a second range.

Optionally, the indication information is indication information that the network device sends at a time domain position except the time domain position of the middle value of the third radio frame in two adjacent SFNs within the SFN cycle, or the indication information is indication information that the network device sends at a time domain position except the second range within the SFN cycle.

Optionally, in the implementation of the present disclosure, the terminal device may also determine at least one CG resource according to the starting offset of the first CG resource.

Optionally, the at least one CG resource is distributed in at least one SFN cycle.

The wireless communication method 300 of the implementation of the present disclosure will be described in detail below through specific implementations.

Optionally, as an implementation 3, the network device configures the CG resource of the type 1 to the terminal device through the RRC, for example, the network device configures an uplink CG resource related parameter through a pre-configured grant configuration information element.

The uplink CG resource related parameter may specifically include the following.
  a) It is configured the period (periodicity) of the CG resource.
    For example, the period is 5130 ms.
  b) It is configured the time offset (timeDomainOffset) of the CG resource.
    For example, offset SFNs are 3 SFNs, that is, offset slots are 30 slots (the SCS of 15 khz).
  c) It is configured the time allocation (timeDomainAllocation) of the CG resource.
    For example, an offset symbol is 0, that is, a transmission position is a position with symbol=0.

Figure 8:
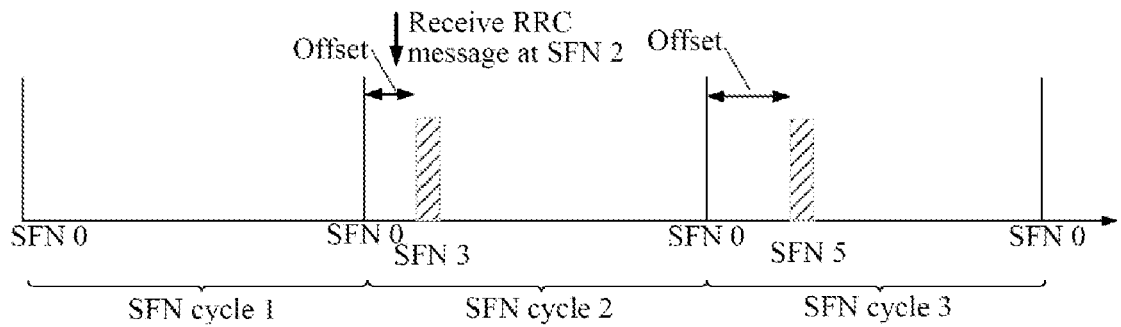
FIG. 8 is a schematic diagram of yet another determination of a CG source according to an implementation of the present disclosure.

In the implementation 3, as shown in FIG. 8, the terminal device receives the CG resource of the type 1 configured by the network device through the RRC, and determines the reference SFN cycle and/or the reference SFN. Then, according to the determined reference SFN cycle and/or the reference SFN, the terminal device calculates the starting offset of the CG resource of the type 1 configured and a position of every subsequent available CG resource (the calculated position of the CG resource is distributed in at least one SFN cycle; herein, one or more positions of CG resources may exist in every SFN cycle), using a calculation formula of the GC resource. Specifically, the terminal device determines an SFN cycle where the radio frame, at which the RRC message is received, is located as the reference SFN cycle.

For example, the terminal device receives the RRC message in the radio frame with SFN=2, then a UE considers the SFN cycle where the radio frame with SFN=2 is located as the reference SFN cycle (an SFN cycle 2 as shown in FIG. 8).

The terminal device determines a specific SFN radio frame (SFN=M) in the reference SFN cycle as a reference subframe, and a number M of the specific radio frame may be indicated or predefined. Specifically, the radio frame with the specific number may be the radio frame with SFN=0 in the reference SFN cycle, as the reference radio frame.

For example, the terminal device takes the radio frame with SFN=0 in the SFN cycle 2 as shown in FIG. 8 as the reference radio frame.

The terminal device calculates the starting offset of the CG resource according to the reference SFN radio frame and/or the reference SFN cycle.

For example, the terminal device calculates the initial offset position of the CG resource by taking the radio frame with SFN=0 in the SFN cycle 2 as shown in FIG. 8 as the reference subframe, that is, the initial CG time domain position is a position with SFN=3 and symbol=0.

Accordingly, in a next SFN cycle (an SFN cycle 3 as shown in FIG. 8), with the radio frame with SFN=0 in the SFN cycle 2 as shown in FIG. 8 as the reference subframe, the calculated initial CG time domain position in the next SFN cycle is a position with SFN=5 and symbol=0. And so on.

It should be noted that in order to ensure that the network device and terminal device have same understanding of the reference SFN cycle, the network device needs to ensure that no RRC message carrying a CG resource configuration of the type 1 is sent at near SFN=0 (assuming that the SFN cycle with SFN=0 is an SFN cycle a, then an SFN M in an SFN cycle a−1 and an SFN N in the SFN cycle a are near SFN=0).

Optionally, in the implementation 3, when determining the reference SFN cycle, the terminal device may also take the SFN cycle before the SFN cycle where the subframe for receiving the RRC message is located (i.e., a first SFN cycle as shown in FIG. 8) as the reference SFN cycle. An advantage thereof is that, it is ensured that in any case, once the RRC message is received, the earliest position where there may be an available CG resource may be used from the time when the RRC message is received, without waiting for the offset time of the timedomainoffset.

For example, the terminal device receives the RRC message at SFN=8 of the SFN cycle 2, in which the indicated timedomainoffset represents an offset of 800 slots (i.e., 80 radio frames). If a current SFN cycle is taken as a reference, there is a possible CG resource only from a 79th SFN position of the SFN cycle 2 (thus, services can only be started to transmit after the SFN 79). If one previous SFN cycle of the current SFN cycle is taken as the reference, there may be a CG resource from an SFN 8 (thus, services may be started to transmit after the SFN 8).

Optionally, as an implementation 4, the network device configures the CG resource of the type 1 to the terminal device through the RRC, for example, the network device configures an uplink CG resource related parameter through a pre-configured grant configuration information element.

The uplink CG resource related parameter may specifically include the following.
  a) It is configured the period (periodicity) of the CG resource.
    For example, the period is 5130 ms.
  b) It is configured the time offset (timeDomainOffset) of the CG resource.
    For example, offset SFNs are 3 SFNs, that is, offset slots are 30 slots (the SCS of 15 khz).
  c) It is configured the time allocation (timeDomainAllocation) of the CG resource.
    For example, an offset symbol is 0, that is, a transmission position is a position with symbol=0.

Figure 9:
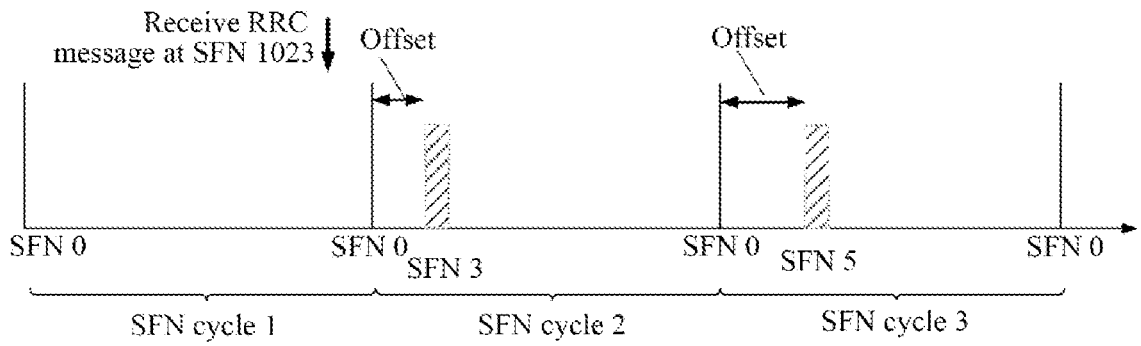
FIG. 9 is a schematic diagram of yet another determination of a CG source according to an implementation of the present disclosure.

In the implementation 4, as shown in FIG. 9, the terminal device receives the CG resource of the type 1 configured by the network device through the RRC, and determines the reference SFN. Then, according to the determined SFN, the terminal device calculates the starting offset of the CG resource of the type 1 configured and a position of every subsequent available CG resource (the calculated position of the CG resource is distributed in at least one SFN cycle), using a calculation formula of the GC resource.

The terminal device determines a reference subframe. Specifically, the terminal device takes a radio frame with SFN=x nearest to the subframe receiving the RRC message as a reference radio frame. Herein, the radio frame with SFN=x may be indicated by the network or predefined. For example, the radio frame may be a radio frame with SFN=0. Specifically, the terminal device takes the radio frame with SFN=0 nearest to the radio frame receiving the RRC message as the reference subframe.

For example, when the terminal device receives the RRC message containing the CG configuration at a moment of SFN=2, the terminal device determines that the SFN is closest to the radio frame with SFN=0 in the SFN cycle 2 as shown in FIG. 9, and the terminal device takes the SFN (the radio frame with SFN=0 in the SFN cycle 2 as shown in FIG. 9) as the reference radio frame.

For another example, the terminal device receives the RRC message containing the CG configuration at a moment of SFN=1023 (in the SFN cycle 1 as shown in FIG. 9), the terminal device determines that the SFN is closest to the radio frame with SFN=0 in the SFN cycle 2 as shown in FIG. 9, and the terminal device takes the SFN radio frame (the radio frame with SFN=0 in the SFN cycle 2 as shown in FIG. 9) as the reference radio frame.

The terminal device calculates the starting offset of the CG resource according to the reference SFN subframe.

For example, the terminal device calculates the initial offset position of the CG resource by taking the radio frame with SFN=0 in the SFN cycle 2 as shown in FIG. 9 as the reference radio frame, that is, the initial CG time domain position is a position with SFN=3 and symbol=0.

Accordingly, in a next SFN cycle (an SFN cycle 3 as shown in FIG. 9), with the radio frame with SFN=0 in the SFN cycle 2 as shown in FIG. 9 as the reference radio frame, the calculated initial CG time domain position in the next SFN cycle is a position with SFN=5 and symbol=0. And so on.

It should be noted that in order to ensure that the network device and terminal device have same understanding of the reference SFN cycle, the network device needs to ensure that no RRC message carrying a CG resource configuration of the type 1 is sent at near a first time. The first time is an intermediate value between two frames with SFN=M in front and rear two SFN cycles. For example, M=0, then the first time is SFN=512. Then, the network device does not perform sending the RRC message carrying the CG resource configuration of the type 1 at near SFN=512.

It should be understood that the formula for calculating the CG resource position in the implementation of the present disclosure may refer to the above formula 1.

Therefore, in the implementation of the present disclosure, the terminal device may determine the reference time domain information of the CG resource according to the radio frame and/or the slot where the indication information sent by the network device is received, and determine the starting offset of the first CG resource and/or the resource position of the second CG resource according to the reference time domain information. Therefore, the terminal device and the network device are guaranteed to have same understanding of the starting offset of the CG resource, and a problem of inconsistent understanding of the reference SFN caused by SFN surrounding is avoided, thereby ensuring that terminal device causes the calculated position of the CG resource to conform to a configuration target of the network device, ensuring that there is an available uplink resource when the TSC service arrives, and thus ensuring QoS of the TSC service.

Figure 10:
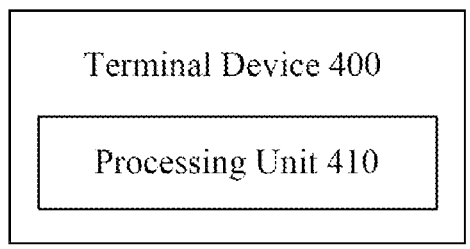
FIG. 10 is a schematic block diagram of a terminal device according to an implementation of the present disclosure.

FIG. 10 shows a schematic block diagram of a terminal device 400 according to an implementation of the present disclosure. As shown in FIG. 10, the terminal device 400 includes a processing unit 410.

The processing unit 410 is configured to determine SFN reference information and a time domain offset of a first CG resource according to dedicated information sent by a network device, wherein the SFN reference information is used for indicating a reference time of the time domain offset of the first CG resource.

The processing unit 410 is further configured to determine a starting offset of the first CG resource and/or a time domain position of a second CG resource according to the SFN reference information and the time domain offset of the first CG resource.

Optionally, the SFN reference information at least includes one of the following: an SFN label or a slot symbol, wherein the SFN label at least includes one of the following: an SFN index or an SFN identity.

Optionally, in a case that the SFN reference information includes the SFN label and the slot symbol, the slot symbol is used for indicating a slot identity in an SFN corresponding to the SFN label, or the slot symbol is used for indicating a slot offset value of a slot 0 in the SFN.

Optionally, in a case that the SFN reference information includes the slot symbol, the slot symbol is used for indicating a slot identity in any one SFN cycle, or the slot symbol is used for indicating an SFN 0 or a slot offset value of a slot 0 of the SFN 0 in any one SFN cycle.

Optionally, the processing unit 410 is specifically configured to: determine the SFN reference information according to a designated SFN, wherein the designated SFN includes an SFN closest to a receiving moment of the dedicated information before receiving the dedicated information, and the designated SFN has a same time point as the SFN reference information.

Optionally, the processing unit 410 is specifically configured to: determine the starting offset of the first CG resource and/or the time domain position of the second CG resource according to the designated SFN and the time domain offset of the first CG resource.

Optionally, the time domain position of the second CG resource is an initial time domain position in one or more SFN cycles after the first CG resource.

Optionally, the time domain position of the second CG resource is a time domain position of at least one CG resource in one or more SFN cycles after the first CG resource.

Optionally, the time domain offset of the first CG resource includes one of the following: a time domain offset at a radio frame level or a time domain offset at the slot level.

Optionally, the dedicated information further includes at least one of the following: a period of a CG resource, a frequency domain position of the CG resource, a time domain offset at the slot level of the CG resource, a time domain offset at a radio frame level of the CG resource, or a time domain offset at the symbol level of the CG resource.

Optionally, the terminal device 400 further includes a communication unit 420.

The communication unit 420 is configured to receive the dedicated information sent by the network device through an RRC signaling.

Optionally, the RRC signaling is a pre-configured grant configuration IE.

Optionally, the first CG resource and/or the second CG resource are CG resources of a type 1.

It should be understood that the terminal device 400 according to the implementation of the present disclosure may correspond to the terminal device in the method implementation of the present disclosure, and the above-mentioned and other operations and/or functions of various units in the terminal device 400 are respectively used for implementing the corresponding processes of the terminal device in the method 200 shown in FIG. 4, which will not be repeated here for brevity.

Figure 11:
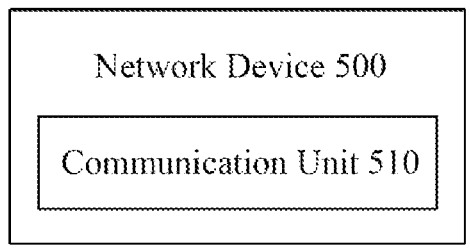
FIG. 11 is a schematic block diagram of a network device according to an implementation of the present disclosure.

FIG. 11 shows a schematic block diagram of a network device 500 according to an implementation of the present disclosure. As shown in FIG. 11, the network device 500 includes a communication unit 510.

The communication unit 510 is configured to send dedicated information to a terminal device, the dedicated information being used for the terminal device to determine SFN reference information and a time domain offset of a first CG resource, wherein the SFN reference information is used for indicating a reference time of the time domain offset of the first CG resource, and the time domain offset of the first CG resource is used for the terminal device to determine a starting offset of the first CG resource and/or a time domain position of a second CG resource in combination with the SFN reference information.

Optionally, the SFN reference information at least includes one of the following: an SFN label or a slot symbol, wherein the SFN label at least includes one of the following: an SFN index or an SFN identity.

Optionally, in a case that the SFN reference information includes the SFN label and the slot symbol, the slot symbol is used for indicating a slot identity in an SFN corresponding to the SFN label, or the slot symbol is used for indicating a slot offset value of a slot 0 in the SFN.

Optionally, in a case that the SFN reference information includes the slot symbol, the slot symbol is used for indicating a slot identity in any one SFN cycle, or the slot symbol is used for indicating an SFN 0 or a slot offset value of a slot 0 in the SFN 0 in any one SFN cycle.

Optionally, the time domain position of the second CG resource is an initial time domain position in one or more SFN cycles after the first CG resource.

Optionally, the time domain position of the second CG resource is a time domain position of at least one CG resource in one or more SFN cycles after the first CG resource.

Optionally, the time domain offset of the first CG resource includes one of the following: a time domain offset at a radio frame level, or a time domain offset at the slot level.

Optionally, the dedicated information further includes at least one of the following: a period of a CG resource, a frequency domain position of the CG resource, a time domain offset at the slot level of the CG resource, a time domain offset at a radio frame level of the CG resource, or a time domain offset at the symbol level of the CG resource.

Optionally, the communication unit 510 is specifically configured to send the dedicated information to the terminal device through an RRC signaling.

Optionally, the RRC signaling is a pre-configured grant configuration IE.

Optionally, the first CG resource and/or the second CG resource are CG resources of a type 1.

It should be understood that the network device 500 according to the implementation of the present disclosure may correspond to the network device in the method implementation of the present disclosure, and the above-mentioned and other operations and/or functions of various units in the network device 500 are respectively used for implementing the corresponding processes of the network device in the method 200 shown in FIG. 4, which will not be repeated here for brevity.

Figure 12:
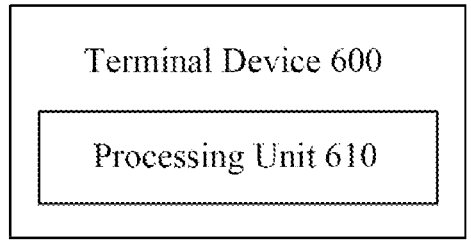
FIG. 12 is a schematic block diagram of another terminal device according to an implementation of the present disclosure.

FIG. 12 shows a schematic block diagram of a terminal device 600 according to an implementation of the present disclosure. As shown in FIG. 12, the terminal device 600 includes a processing unit 610.

The processing unit 610 is configured to determine, by the terminal device, reference time domain information of a CG resource according to a radio frame and/or a slot where indication information sent by a network device is received, wherein the indication information is used for configuring a first CG resource.

The processing unit 610 is further configured to determine, by the terminal device, a starting offset of the first CG resource and/or a resource position of a second CG resource according to the reference time domain information.

Optionally, the reference time domain information at least includes one of the following: a reference System Frame Number (SFN) period of the CG resource, or a reference SFN of the CG resource.

Optionally, the processing unit 610 is specifically configured to execute one of the following: determining a starting offset of the first CG resource and/or the resource position of the second CG resource according to an SFN cycle where the radio frame and/or the slot is located; or, determining the starting offset of the first CG resource and/or the resource position of the second CG resource according to an N-th cycle before the SFN cycle where the radio frame and/or the slot is located, wherein N is a positive integer.

Optionally, the processing unit 610 is specifically configured to at least execute one of the following: determining the starting offset of the first CG resource and/or the resource position of the second CG resource according to a first designated radio frame in the SFN cycle where the radio frame and/or the slot is located; or, determining the starting offset of the first CG resource and/or the resource position of the second CG resource according to a second designated radio frame in the N-th cycle before the SFN cycle where the radio frame and/or the slot is located, wherein N is a positive integer.

Optionally, the first designated radio frame and the second designated radio frame are indicated by the indication information, or the first designated radio frame and the second designated radio frame are predefined radio frames.

Optionally, the processing unit 610 is specifically configured to: determine a radio frame with a time domain interval from the radio frame and/or the slot being smaller than a preset interval as a third radio frame in a time domain; and determine the starting offset of the first CG resource and/or the resource position of the second CG resource according to the third radio frame.

Optionally, the preset interval is indicated by the indication information, or the preset interval is a predefined time domain interval.

Optionally, the resource position of the second CG resource is an initial time domain position in one or more SFN cycles after the first CG resource.

Optionally, the time domain position of the second CG resource is a time domain position of at least one CG resource in one or more SFN cycles after the first CG resource.

Optionally, the indication information is, within the SFN cycle, indication information that the network device does not perform sending at a time domain position with SFN 0 or a time domain position in a first range.

Optionally, the indication information is, within the SFN cycle, indication information that the network device does not perform sending at a time domain position of a middle value of the third radio frame in two adjacent SFNs or a time domain position in a second range.

Optionally, the indication information includes at least one of the following: a period of the CG resource, a frequency domain position of the CG resource, a time domain offset at the slot level of the CG resource, a time domain offset at a radio frame level of the CG resource, or a time domain offset at the symbol level of the CG resource.

Optionally, the terminal device 600 further includes a communication unit 620.

The communication unit 620 is configured to receive the indication information sent by the network device through an RRC signaling.

Optionally, the RRC signaling is a pre-configured grant configuration Information Element (IE).

Optionally, the first CG resource and/or the second CG resource are CG resources of a type 1.

It should be understood that the terminal device 600 according to the implementation of the present disclosure may correspond to the terminal device in the method implementation of the present disclosure, and the above-mentioned and other operations and/or functions of various units in the terminal device 600 are respectively used for implementing the corresponding processes of the terminal device in the method 300 shown in FIG. 7, which will not be repeated here for brevity.

Figure 13:
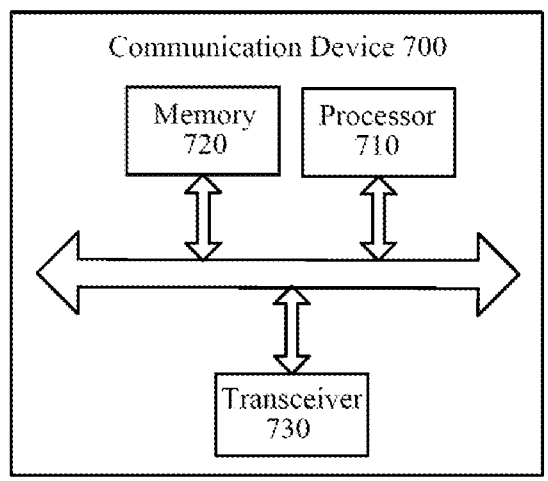
FIG. 13 is a schematic block diagram of a communication device according to an implementation of the present disclosure.

FIG. 13 is a schematic structural diagram of a communication device 700 according to an implementation of the present disclosure. The communication device 700 shown in FIG. 13 includes a processor 710, which may call and run a computer program from a memory to implement the method in the implementation of the present disclosure.

Optionally, as shown in FIG. 13, the communication device 700 may further include a memory 720. Herein, the processor 710 may call and run a computer program from the memory 720 to implement the method in the implementation of the present disclosure.

Herein, the memory 720 may be one separate device independent of the processor 710, or may be integrated in the processor 710.

Optionally, as shown in FIG. 13, the communication device 700 may further include a transceiver 730, and the processor 710 may control the transceiver 730 to communicate with another device. Specifically, information or data may be sent to another device, or information or data sent by another device may be received.

Herein, the transceiver 730 may include a transmitter and a receiver. The transceiver 730 may further include an antenna, a quantity of which may be one or more.

Optionally, the communication device 700 may specifically be a network device or a base station of an implementation of the present disclosure, and the communication device 700 may implement the corresponding processes implemented by the network device or the base station in various methods of the implementations of the present disclosure, which will not be repeated here for brevity.

Optionally, the communication device 700 may be specifically a mobile terminal device/terminal device of an implementation of the present disclosure, and the communication device 700 may implement corresponding processes implemented by the mobile terminal device/terminal device in various methods of the implementations of the present disclosure, which will not be repeated here for brevity.

Figure 14:
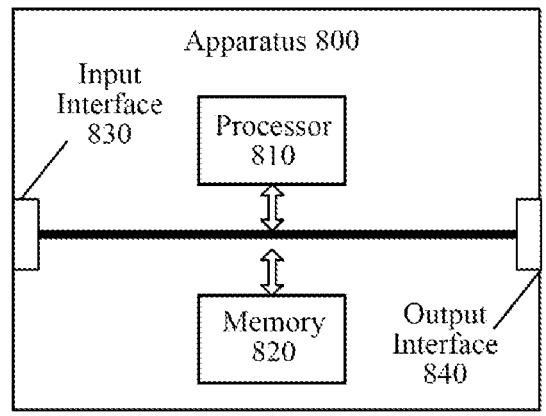
FIG. 14 is a schematic block diagram of an apparatus according to an implementation of the present disclosure.

FIG. 14 is a schematic diagram of a structure of an apparatus according to an implementation of the present disclosure. The apparatus 800 shown in FIG. 14 includes a processor 810. The processor 810 may call and run a computer program from a memory to implement the method in the implementation of the present disclosure.

Optionally, as shown in FIG. 14, the apparatus 800 may further include a memory 820. Herein, the processor 810 may call and run a computer program from the memory 820 to implement the method in the implementation of the present disclosure.

Herein, the memory 820 may be one separate device independent of the processor 810, or may be integrated in the processor 810.

Optionally, the apparatus 800 may further include an input interface 830. Herein, the processor 810 may control the input interface 830 to communicate with another device or chip. Specifically, information or data sent by another device or chip may be acquired.

Optionally, the apparatus 800 may further include an output interface 840. Herein, the processor 810 may control the output interface 840 to communicate with another device or chip. Specifically, information or data sent by another device or chip may be outputted.

Optionally, the apparatus may be applied to a network device or a base station in an implementation of the present disclosure, and the apparatus may implement the corresponding processes implemented by the network device or the base station in various methods of the implementations of the present disclosure, which will not be repeated here for brevity.

Optionally, the apparatus may be applied to a mobile terminal device/terminal device in an implementation of the present disclosure, and the apparatus may implement the corresponding processes implemented by the mobile terminal device/terminal device in various methods of the implementations of the present disclosure, which will not be repeated here for brevity.

Optionally, the apparatus mentioned in an implementation of the present disclosure may also be a chip. For example, it may be a system-level chip, a system chip, a chip system, or a system chip-on-chip, etc.

Figure 15:
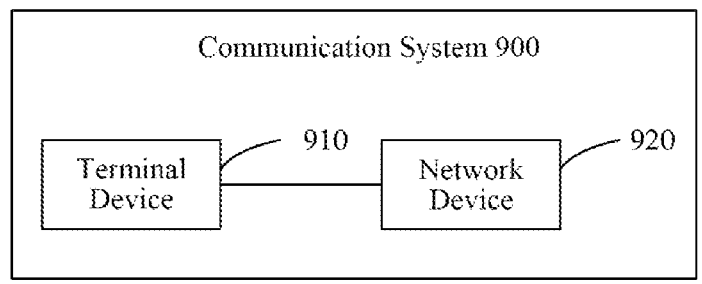
FIG. 15 is a schematic block diagram of a communication system according to an implementation of the present disclosure.

FIG. 15 is a schematic block diagram of a communication system 900 provided by an implementation of the present disclosure. As shown in FIG. 15, the communication system 900 includes a terminal device 910 and a network device 920.

Herein, the terminal device 910 may be configured to implement the corresponding functions implemented by the terminal device in the above methods, and the network device 920 may be configured to implement the corresponding functions implemented by the network device or a base station in the above methods, which will not be repeated here for brevity.

It should be understood that the processor in an implementation of the present disclosure may be an integrated circuit chip with a capability for processing signals. In an implementation process, the acts of the method implementations described above may be completed by integrated logic circuits of hardware in the processor or instructions in a form of software. The above processor may be a general purpose processor, a Digital Signal Processor (DSP), an Application Specific Integrated Circuit (ASIC), a Field Programmable Gate Array (FPGA), or another programmable logic device, discrete gate or transistor logic device, or a discrete hardware component. Various methods, acts and logic block diagrams disclosed in implementations of the present disclosure may be implemented. The general purpose processor may be a microprocessor, or the processor may be any conventional processor or the like. The acts of the method disclosed in connection with the implementation of the present disclosure may be directly embodied as being executed and completed by a hardware decoding processor, or being executed and completed by a combination of hardware and software modules in the decoding processor. The software modules may be located in a storage medium commonly used in the art, such as a random access memory, a flash memory, a read-only memory, a programmable read-only memory, or an electrically erasable programmable memory, or a register, etc. The storage medium is located in the memory, and the processor reads information in the memory, and completes the acts of the above method in combination with its hardware.

It should be understood that the memory in implementations of the present disclosure may be a transitory memory or non-transitory memory, or may include both transitory and non-transitory memories. Herein, the non-transitory memory may be a read-only memory (ROM), a programmable ROM (PROM), an erasable programmable ROM (EPROM), an electrically erasable programmable ROM (EEPROM), or a flash memory. The transitory memory may be a random access memory (RAM), which serves as an external cache. As an example, but not as a limitation, many forms of RAMs are available, such as a static random access memory (SRAM), a dynamic random access memory (DRAM), a synchronous dynamic random access memory (SDRAM), a double data rate SDRAM (DDR SDRAM), an enhanced SDRAM (ESDRAM), a Synchlink DRAM (SLDRAM), or a Direct Rambus RAM (DR RAM). It should be noted that the memories of the systems and the methods described herein are intended to include, but are not limited to, these and any other suitable types of memories.

It should be understood that, the foregoing memory is an example for illustration and should not be construed as limiting. For example, the memory in the implementations of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch link DRAM (SLDRAM), or a Direct Rambus RAM (DR RAM), etc. That is, memories in the implementations of the present disclosure are intended to include, but are not limited to, these and any other suitable types of memories.

An implementation of the present disclosure further provides a computer readable storage medium, configured to store a computer program.

Optionally, the computer readable storage medium may be applied to a network device or a base station in an implementation of the present disclosure, and the computer program causes a computer to perform the corresponding processes implemented by the network device or the base station in various methods of the implementations of the present disclosure, which will not be repeated here for brevity.

Optionally, the computer readable storage medium may be applied in a mobile terminal device/terminal device of an implementation of the present disclosure, and the computer program causes a computer to perform corresponding processes implemented by the mobile terminal device/terminal device in various methods of the implementations of the present disclosure, which will not be repeated here for brevity.

An implementation of the present disclosure further provides a computer program product, including computer program instructions.

Optionally, the computer program product may be applied to a network device or a base station in an implementation of the present disclosure, and the computer program instructions cause a computer to perform the corresponding processes implemented by the network device or the base station in various methods of the implementations of the present disclosure, which will not be repeated here for brevity.

Optionally, the computer program product may be applied in a mobile terminal device/terminal device of an implementation of the present disclosure, and the computer program instructions cause a computer to perform corresponding processes implemented by the mobile terminal device/terminal device in various methods of the implementations of the present disclosure, which will not be repeated here for brevity.

An implementation of the present disclosure further provides a computer program.

Optionally, the computer program may be applied to a network device or a base station in an implementation of the present disclosure, and when the computer program is run on a computer, the computer is caused to perform the corresponding processes implemented by the network device or the base station in various methods of the implementations of the present disclosure, which will not be repeated here for brevity.

Optionally, the computer program may be applied in a mobile terminal device/terminal device of an implementation of the present disclosure. When the computer program is run on a computer, the computer is caused to perform corresponding processes implemented by the mobile terminal device/terminal device in various methods of the implementations of the present disclosure, which will not be repeated here for brevity.

Those of ordinary skill in the art may recognize that the exemplary units and algorithm acts described in connection with the implementations disclosed herein can be implemented in electronic hardware, or a combination of computer software and electronic hardware. Whether these functions are implemented in hardware or software depends on a specific application and a design constraint of the technical solution. Skilled in the art may use different methods to implement the described functions for each particular application, but such the implementation should not be considered to be beyond the scope of the present disclosure.

Those skilled in the art may clearly understand that for convenience and conciseness of description, the specific working process of the system, the apparatus, and the unit described above may refer to the corresponding process in the aforementioned method implementations, which will not be repeated here again.

In several implementations provided by the present disclosure, it should be understood that the disclosed system, apparatus, and method may be implemented in another mode. For example, the apparatus implementations described above are only illustrative, for example, the division of the units is only a logical function division, and there may be another division mode in an actual implementation. For example, multiple units or components may be combined or integrated into another system, or some features may be ignored or not executed. On the other hand, the mutual coupling or direct coupling or a communication connection shown or discussed may be indirect coupling or a communication connection through some interfaces, apparatuses, or units, or may be in an electrical, mechanical or another form.

The units described as separated components may or may not be physically separated, and the component shown as a unit may or may not be a physical unit, i.e., it may be located in one place or may be distributed over multiple network units. Part or all of the units therein may be selected according to a practical need to achieve a purpose of the solution of the present implementation.

In addition, various functional units in various implementations of the present disclosure may be integrated in one processing unit, or various units may be physically present separately, or two or more units may be integrated in one unit.

The functions may be stored in a computer readable storage medium, if implemented in a form of a software functional unit and sold or used as a separate product. Regarding such understanding, the technical solution of the present disclosure, in essence, or the part contributing to the prior art, or the part of the technical solution, may be embodied in a form of a software product, wherein the computer software product is stored in a storage medium, and includes several instructions for causing a computer device (which may be a personal computer, a server, or a network device, or the like) to perform all or part of the acts of the methods described in various implementations of the present disclosure. And the aforementioned storage medium includes: various media, such as a U disk, a mobile hard disk, a Read-Only Memory (ROM), a Random Access Memory (RAM), a magnetic disk, or an optical disk, etc., which may store program codes.

The foregoing are merely specific implementations of the present disclosure, but the protection scope of the present disclosure is not limited thereto. Any person skilled in the art may easily conceive variations or substitutions within the technical scope disclosed by the present disclosure, which should all be included within the protection scope of the present disclosure. Therefore, the protection scope of the present disclosure should be subject to the protection scope of the claims.

The invention claimed is:

1. A wireless communication method, comprising:
   determining, by a terminal device, System Frame Number (SFN) reference information and a time domain offset of a first pre-Configured Grant (CG) resource according to dedicated information sent by a network device, wherein the SFN reference information is used for indicating a reference time of the time domain offset of the first CG resource; wherein the dedicated information comprises: a period of the CG resource, reference SFN information, a time domain offset at a slot level of the CG resource, and a time domain offset at a symbol level of the CG resource, wherein the reference SFN information comprises a SFN label and/or a slot label; and
   determining, by the terminal device, a starting offset of the first CG resource and/or a time domain position of a second CG resource according to the SFN reference information and the time domain offset of the first CG resource,
   wherein, determining, by the terminal device, the SFN reference information and the time domain offset of the CG resource according to the dedicated information sent by the network device comprises:
   taking, by the terminal device, one piece of the SFN reference information before an SFN at which the dedicated information is received and closest to a moment when the dedicated information is received as a reference point;
   taking, by the terminal device, the SFN reference information as a reference time point of a time offset value indicated by the dedicated information;
   calculating, by the terminal device, the starting offset of the CG resource according to the reference SFN information.

2. The method of claim 1, wherein,
   wherein, the SFN label at least comprises one of the following: an SFN index or an SFN identity.

3. The method of claim 1, wherein the time domain offset of the first CG resource further comprises one of the following: a time domain offset at a radio frame level or a time domain offset at a slot level.

4. The method of claim 1, further comprising:
   receiving, by the terminal device, the dedicated information sent by the network device through a Radio Resource Control (RRC) signaling,
   wherein, the RRC signaling is a pre-configured grant configuration Information Element (IE),
   wherein, the first CG resource and/or the second CG resource are CG resources of a type 1.

5. A wireless communication method, comprising:
   sending, by a network device, dedicated information to a terminal device, wherein the dedicated information being used for the terminal device to determine System Frame Number (SFN) reference information and a time domain offset of a first pre-Configured Grant (CG) resource, wherein, the dedicated information comprises a period of the CG resource, reference SFN information, a time domain offset at a slot level of the CG resource, and a time domain offset at a symbol level of the CG resource; wherein the reference SFN information comprises a SFN label and/or a slot label, wherein the SFN reference information is used for indicating a reference time of the time domain offset of the first CG resource, the time domain offset of the first CG resource is used for the terminal device to determine a starting offset of the first CG resource and/or a time domain position of a second CG resource in combination with the SFN reference information,
   wherein the SFN reference information is determined by the terminal device through taking one piece of the SFN reference information before an SFN at which the dedicated information is received and closest to a moment when the dedicated information is received as a reference point, wherein the reference SFN information acts as a reference point of a time offset value indicated by the dedicated information.

6. The method of claim 5, wherein,
   wherein, the SFN label at least comprises one of the following: an SFN index or an SFN identity.

7. The method of claim 5, wherein, the time domain offset of the first CG resource comprises one of the following: a time domain offset at a radio frame level or a time domain offset at a slot level.

8. The method of claim 5, wherein, sending, by the network device, the dedicated information to the terminal device, comprises:
   sending, by the network device, the dedicated information to the terminal device through a Radio Resource Control (RRC) signaling.

9. A terminal device, comprising: a processor and a transceiver, wherein
the processor is configured to determine System Frame Number (SFN) reference information and a time domain offset of a first pre-Configured Grant (CG) resource according to dedicated information sent by a network device, wherein the SFN reference information is used for indicating a reference time of the time domain offset of the first CG resource; wherein the dedicated information comprises: a period of the CG resource, reference SFN information, a time domain offset at a slot level of the CG resource, and a time domain offset at a symbol level of the CG resource, wherein the reference SFN information comprises a SFN label and/or a slot label;
the processor is further configured to determine a starting offset of the first CG resource and/or a time domain position of a second CG resource according to the SFN reference information and the time domain offset of the first CG resource,
wherein, the processor is specifically configured to:
take one piece of the SFN reference information before an SFN at which the dedicated information is received and closest to a moment when the dedicated information is received as a reference point;
take the SFN reference information as a reference time point of a time offset value indicated by the dedicated information;
calculate the starting offset of the CG resource according to the reference SFN information.

10. The terminal device of claim 9, wherein,
the SFN label at least comprises one of the following: an SFN index or an SFN identity.

11. The terminal device of claim 9, wherein the time domain offset of the first CG resource comprises one of the following: a time domain offset at a radio frame level or a time domain offset at a slot level.

12. The terminal device of claim 9, wherein the transceiver is configured to receive the dedicated information sent by the network device through a Radio Resource Control (RRC) signaling,
wherein, the RRC signaling is a pre-configured grant configuration Information Element (IE),
wherein the first CG resource and/or the second CG resource are CG resources of a type 1.

13. A network device, comprising: a processor and a transceiver, wherein
the transceiver is configured to send dedicated information to a terminal device, wherein the dedicated information is used for the terminal device to determine System Frame Number (SFN) reference information and a time domain offset of a first pre-Configured Grant (CG) resource, wherein the dedicated information comprises a period of the CG resource, reference SFN information, a time domain offset at a slot level of the CG resource, and a time domain offset at a symbol level of the CG resource; wherein the reference SFN information comprises a SFN label and/or a slot label, wherein the SFN reference information is used for indicating a reference time of the time domain offset of the first CG resource, and the time domain offset of the first CG resource is used for the terminal device to determine a starting offset of the first CG resource and/or a time domain position of a second CG resource in combination with the SFN reference information,
wherein the SFN reference information is determined by the terminal device through taking one piece of the SFN reference information before an SFN at which the dedicated information is received and closest to a moment when the dedicated information is received as a reference point, wherein the reference SFN information acts as a reference point of a time offset value indicated by the dedicated information.

14. The network device of claim 13, wherein the time domain offset of the first CG resource comprises one of the following: a time domain offset at a radio frame level or a time domain offset at a slot level.

15. The network device of claim 13, wherein the transceiver is specifically configured to:
send the dedicated information to the terminal device through a Radio Resource Control (RRC) signaling,
wherein, the RRC signaling is a pre-configured grant configuration Information Element (IE),
wherein the first CG resource and/or the second CG resource are CG resources of a type 1.

* * * * *